United States Patent [19]

Jones

[11] Patent Number: 4,865,466
[45] Date of Patent: Sep. 12, 1989

[54] INTERLOCKING CYLINDER COMPLIANT HYDRODYNAMIC GAS BEARING

[75] Inventor: Allen M. Jones, Novi, Mich.

[73] Assignee: Williams International Corporation, Walled Lake, Mich.

[21] Appl. No.: 214,125

[22] Filed: Jun. 30, 1988

[51] Int. Cl.$^4$ .............. F16C 32/06; F16C 27/02; F16F 1/18; F16M 13/00

[52] U.S. Cl. .................... 384/103; 248/580; 267/136; 267/158; 267/162; 267/164; 384/106; 384/215

[58] Field of Search ............... 384/103–106, 384/215, 220, 222, 535, 581, 611, 620, 100; 267/136, 158, 160, 161, 162, 164, 165; 248/580, 603; 464/180, 82, 84, 100, 101

[56] References Cited

U.S. PATENT DOCUMENTS

| | | | |
|---|---|---|---|
| 3,097,895 | 7/1963 | Matt | 384/215 X |
| 4,213,657 | 7/1980 | Gray | 384/105 |
| 4,300,806 | 11/1981 | Heshmat | 384/103 |

Primary Examiner—Thomas R. Hannon
Attorney, Agent, or Firm—Lyman R. Lyon

[57] ABSTRACT

A spring support system for a compliant hydrodynamic gas lubricated bearing comprises a plurality of cylindrical spring elements that are retained by floating control rods in circumferential and axially extending arrays for the support of a compliant foil.

1 Claim, 1 Drawing Sheet

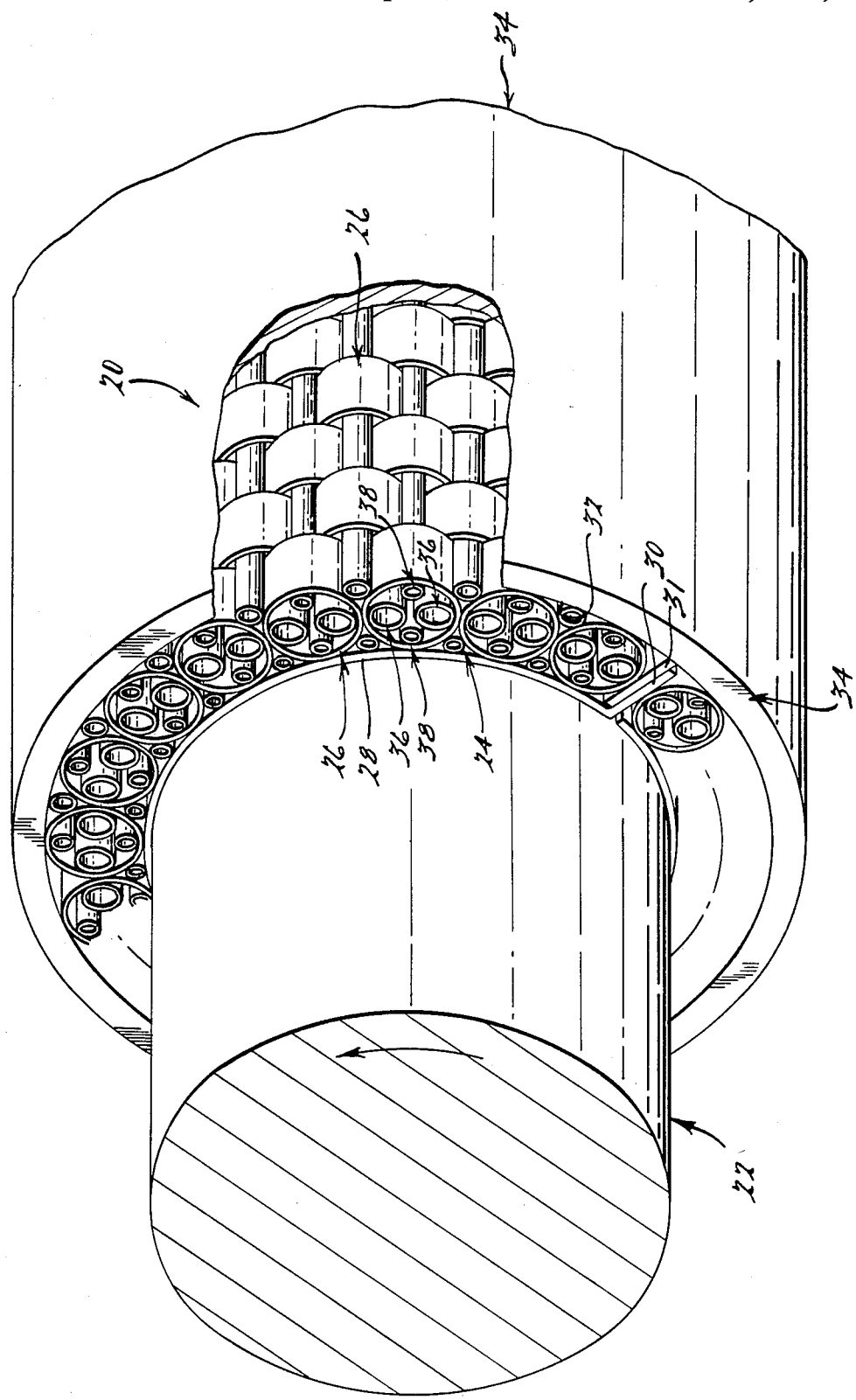

INTERLOCKING CYLINDER COMPLIANT HYDRODYNAMIC GAS BEARING

BACKGROUND OF THE INVENTION

Compliant hydrodynamic gas bearings are used in high performance applications requiring tolerance of high temperature and speed, for example, gas turbine engines. Such bearings exhibit superior operational and durability characteristics as compared to bearings which require liquid lubrication and liquid cooling systems.

One problem experienced in known hydrodynamic gas bearings is that the foil must be sufficiently compliant to conform to the supported member uniformly under all conditions, yet be fully supported so as to exhibit significant load capacity accompanied by an ability to control orbital motion. Orbital excursion of a shaft is due to the fact that a high-speed shaft tends to orbit about the geometric center of its bearing. The amplitude of the orbital motion is maximized at certain critical speeds and is especially critical in the case of small journal bearings. Proper control or elimination of high-speed instability by a multipoint suspension permits the bearing of the instant invention to operate to the burst speed of the rotating assembly.

SUMMARY OF THE INVENTION

The present invention teaches the use of an interlocking cylinder support system for a relatively thin highly compliant foil. A plurality of radially resilient foil support cylinders are maintained in a controlled array by a plurality of primary and secondary control rods. The foil develops a surface geometry corresponding to the array of the cylinders. In operation, a dedicated, relatively thin but fully supported compliant foil is presented to the journal of a shaft.

BRIEF DESCRIPTION OF THE DRAWINGS

FIG. 1 is a perspective view, partially broken away, of a cylindrical spring support system for a compliant hydrodynamic gas lubricated bearing in accordance with the instant invention.

DETAILED DESCRIPTION OF THE PREFERRED EMBODIMENT OF THE INVENTION

Referring to the drawing, a compliant hydrodynamic gas bearing 20 in accordance with a preferred embodiment of the present invention is shown in combination with a shaft 22. A flexible compliant foil 24 is supported by a plurality of cylindrical resilient spring elements 26. The foil 24 comprises an inner shaft engaging portion 28 that encircles the shaft 22 and a radial portion 30 that is attached to a flange 31 that extends radially inwardly from an inner surface 32 of a bearing housing 34 to preclude indexing of the foil 24. The spring elements 26 are directly engaged with the foil 24 and bearing housing 34 yet are relatively slidable relative thereto to maximimize Coulomb damping.

The spring elements 26 are retained in a plurality of axially stacked circumferential arrays by a plurality of axially extending primary and secondary internal control tubes or rods 36 and 38, respectively. The control rods 36 and 38 are mechanically trapped within and between axially and circumferentially spaced springs 26. Each spring element 26 is free to radially contract or expand independently of adjacent spring elements 26.

Thus, each spring element 26 provides (a) localized contour stiffness to the foil 24 to prevent unwanted undulations in the hydrodynamic fluid-film thereunder that would decrease the load carrying capacity of the bearing and (b) the primary Coulomb damping function exhibited by the bearing under oscillatory loads. This damping occurs between the contact surfaces of each spring 26 and the mating surface of the foil 24. Since damping is directly related to the coefficient of friction between the relatively slidable surfaces, surface treatment of one or both members can be utilized to fine tune the damping characteristics.

The support system optimizes (a) the hydrodynamic fluid-film and load-carrying capacity thereof, (b) bearing damping capability, (c) staged increase in stiffness with increasing load on the foil 24, and (d) the capability of withstanding misalignment between the foil 24 and the bearing housing 34.

It is to be noted that both the primary control rods 36 and the secondary control rods 38 are physically trapped by adjacent circumferentially and axially related springs 26 thereby obviating the requirement for welding, riveting, or other forms of fastening between the spring elements 26 and the rods 36 and 38. In turn, the springs 26 are retained in their circumferentially aligned axially staggered arrays by the control rods 36 and 38. The end result is a flexible self adjusting support system for the foil 24, all components of which are relatively movable with respect to the foil to maximize Coulomb dampening.

In operation, rotation of the shaft 22 relative to the foil 24 induces the formation of a boundary layer of gas in a plurality of wedge-shaped gaps between the shaft surface and the bearing surface of the foil 24. The wedge-shaped gas layer is inherently formed in the journal bearing due to radial deflection of the foil 24 between support points. The spring elements 26 accommodate both radial and circumferential deflection of the foil 24 in accordance with the pressure profile of the hydrodynamic gas film so as to provide maximum load-carrying capacity, to tolerate bearing misalignments and skew loads, and to tolerate thermal distortions. Load-carrying capacity is enhanced by the geometry and disposition of the cylindrical spring elements 26 which provide an initial soft layer of support that becomes progressively stiffer in the radial direction without substantial radial growth.

Under misaligned or skewed load conditions, substantial deflection of one edge of the bearing assembly 20 may occur. Such lateral deflection between the shaft 22 and the stationary housing 34 is individually compensated by the spring elements 26. Thus, the spring constant of each individual spring element 26 provides the means to tailor resistance to lateral deflection of the shaft 22 thereby to tolerate bearing misalignment and skew loads. In addition, the clearance space between the shaft 22 and the foil 24 at the two ends of the bearing 20 remains substantially uniform across the journal surface of the shaft 20 within the constraints imposed by the pressure profile of the hydrodynamic gas fluid-film. It also enables the pressure profile across the foil 24 to be relatively uniform since the bearing clearance is relatively uniform due to multipoint support, thereby minimizing any reduction in load capacity of the bearing due to pressure variations. In addition, heat generated in the fluid-film and transferred to the foil 24 is relatively efficiently dissipated by large surface area of the springs 26, preventing localized heat distortion of the foil 24.

While the preferred embodiment of the invention has been disclosed, it should be appreciated that the invention is susceptible of modification without departing from the scope of the following claims.

I claim:

1. An interlocked spring support and Coulomb damping system for a compliant hydrodynamic gas bearing having a central axis comprising
 a first plurality of cylindrical spring elements disposed in a circumferentially extending radially aligned array, the central axis of said elements extending parallel to the central axis of said bearing,
 a second plurality of cylindrical spring elements disposed in a circumferentially extending radially aligned array axially adjacent to said first plurality of springs, the central axis of the springs thereof being spaced circumferentially, respectively, equidistant from the adjacent central axes of said first plurality of spring elements,
 a plurality of primary spring control rods extending internally of and axially through each of said springs for retaining said springs in said circumferential array,
 a plurality of secondary control rods extending internally of one of said arrays and externally of an axially adjacent array, and
 a flexible foil disposed radially inwardly from said springs and directly supported thereby.

* * * * *